United States Patent

Roesies

[15] 3,653,686
[45] Apr. 4, 1972

[54] FIFTH WHEEL COUPLING FOR TRACTOR-TRAILER VEHICLE

[72] Inventor: David J. Roesies, 16127 Francisquito Ave., La Puente, Calif. 91744

[22] Filed: Apr. 17, 1970

[21] Appl. No.: 29,546

[52] U.S. Cl. ............................................280/421, 280/434
[51] Int. Cl. .........................................................B62d 53/08
[58] Field of Search ................................280/421, 422, 434

[56] References Cited

UNITED STATES PATENTS

| | | | |
|---|---|---|---|
| 2,092,115 | 9/1937 | Gurton | 280/421 |
| 2,119,460 | 5/1938 | Gurton | 280/421 |
| 2,480,483 | 8/1949 | Kirksey | 280/421 |
| 3,391,950 | 7/1968 | Carter et al. | 280/421 |
| 2,142,748 | 1/1939 | Fontaine | 280/434 |

Primary Examiner—Leo Friaglia
Attorney—Boniard I. Brown

[57] ABSTRACT

A fifth wheel coupling for a tractor-trailer vehicle including a fifth wheel plate to be rockably mounted on the tractor, a turntable plate to be rotatably mounted on the trailer, means releasably joining the plates in coupled relation, wherein the table plate rests on and is coupled to the wheel plate, and mating conduit coupling parts mounted on the plates for relative movement into and from mating engagement upon relative movement of the plates into and from coupled relation. The mating conduit coupling parts may constitute an electrical coupling for transmitting electrical power between the tractor and trailer and a hose coupling for transmitting pressure fluid, such as braking air, between the tractor and trailer.

8 Claims, 5 Drawing Figures

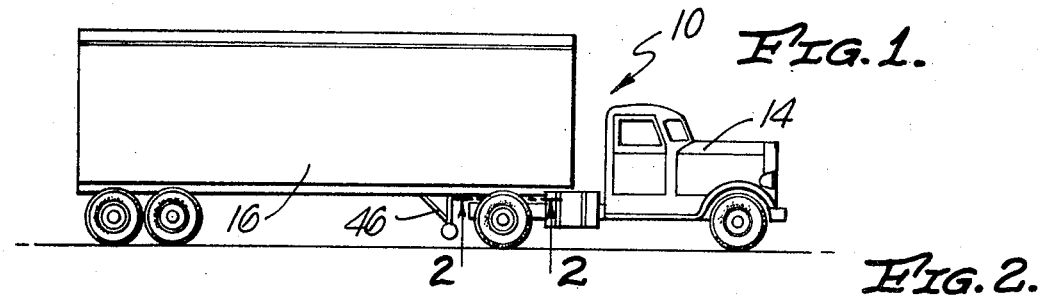

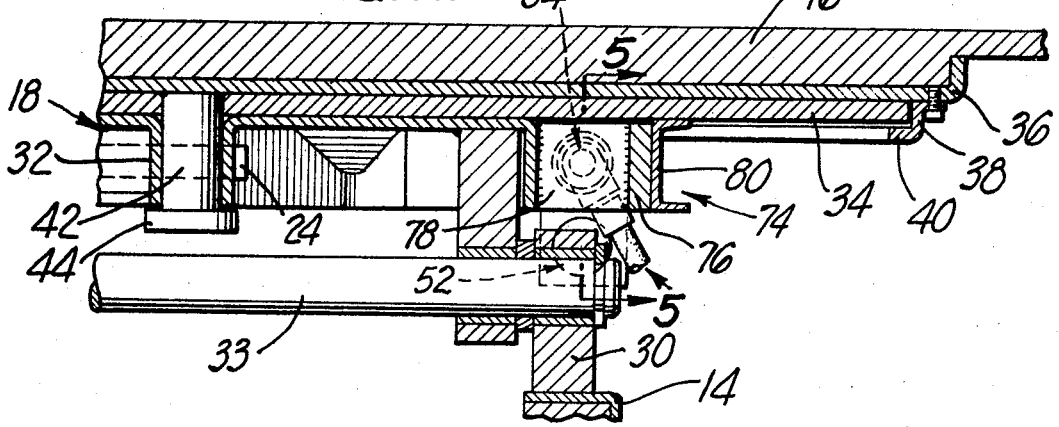
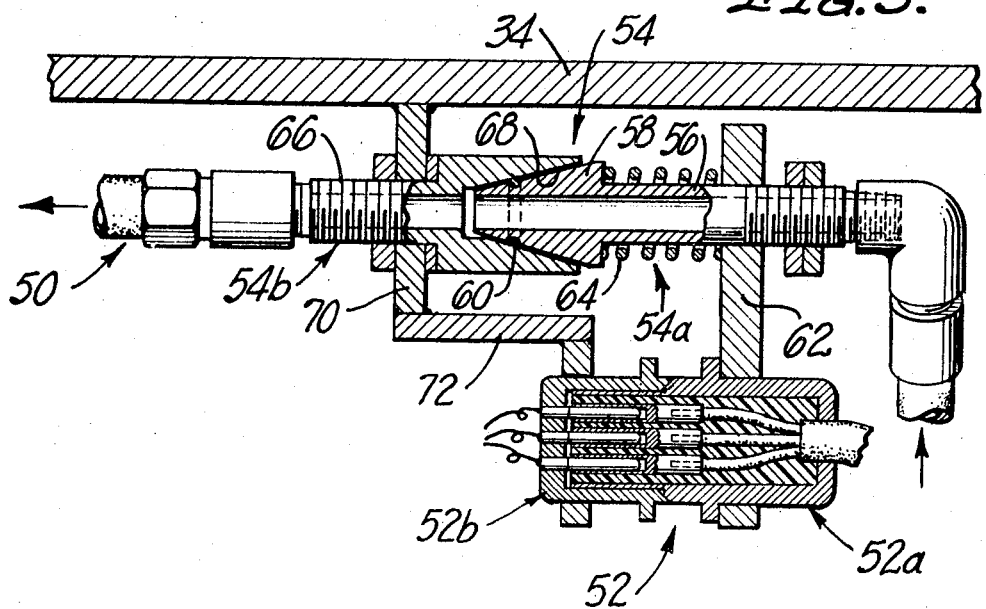

FIFTH WHEEL COUPLING FOR TRACTOR-TRAILER VEHICLE

BACKGROUND OF THE INVENTION

1. Field of the Invention

This invention relates generally to tractor-trailer vehicles and more particularly to a novel fifth wheel coupling for such vehicles.

2. Prior Art

A tractor-trailer vehicle is a cargo hauling vehicle having a self-propelled towing unit, referred to as a tractor, a following cargo carrier, referred to as a semi-trailer, coupled to the tractor, and in some cases, a second cargo carrier, referred to as a trailer, coupled to the semi-trailer. The semi-trailer, referred to in this disclosure simply as a trailer, is connected to the tractor by means of a fifth wheel coupling. This coupling serves the dual function of transmitting towing loads between the tractor and trailer and vertically supporting the front end of the trailer on the tractor. When detached from the tractor, the front end of the trailer is supported on depending struts, mounting, in some cases, small ground engaging rollers.

A conventional fifth wheel coupling for a tractor-trailer vehicle has a wheel plate rockably mounted on the rear of the tractor on a traverse pivot axis of the tractor, and a king pin depending from the underside of the trailer for rotatable coupling engagement within a central coupling socket in the wheel plate. Extending rearwardly through the wheel plate from its coupling socket through the rear edge of the plate is a slot through which the trailer king pin may undergo relative movement into and from the socket. A retractable lock bolt extends across the end of the slot adjacent the coupling socket to releasably lock the king pin in the socket. The wheel plate is so oriented that when the trailer is detached from the tractor, the plate rotates on its pivot axis to an inclined position wherein the plate slopes upwardly in the forward direction.

When coupling a tractor to a trailer, the tractor is backed toward the trailer to locate the wheel plate of the fifth wheel coupling below and in supporting contact with the front end of the trailer in a manner such that the king pin on the trailer enters the coupling socket in the wheel plate through its slot. The lock bolt in the wheel plate is then extended to lock the king pin in the socket.

In addition to the mechanical connection between tractor and trailer provided by the fifth wheel coupling, a tractor-trailer vehicle has a number os service conduits for transmitting electrical power and pressure fluid, such as air or hydraulic fluid, between the tractor for operating lights, brakes, and the like on the tractor. These conduits contain service couplings which must be disengaged when the tractor is uncoupled from the trailer and reengaged when the tractor is coupled to the trailer. A major disadvantage of the existing vehicles resides in the fact that the service couplings must be disengaged and reengaged individually by hand. As a consequence, coupling and uncoupling of a tractor-trailer vehicle is quite a tedious and time consuming operation.

SUMMARY OF THE INVENTION

The present invention avoids the above disadvantage of the existing trailer-tractor vehicles by providing an improved fifth wheel coupling for such a vehicle embodying electrical and fluid service couplings which automatically engage and disengage upon coupling and uncoupling of the tractor and trailer. The improved fifth wheel coupling has a fifth wheel plate to be mounted on the tractor and a rotating turntable or turntable plate, hereafter referred to simply as a table plate, to be rotatably mounted on the trailer of a tractor-trailer vehicle. Depending from the underside of the table plate on its rotation axis is a king pin for coupling engagement within a central coupling socket in the wheel plate. The wheel plate has a slot through which the king-pin undergoes relative movement into and from the socket during relative movement of the wheel plate and table plate to and from coupled relation. The king-pin is releasably locked on the socket by the usual retractable lock bolt.

According to one feature of the invention, the fifth wheel coupling is equipped with electrical and fluid service couplings including mating coupling parts which are mounted on the wheel plate and table plate to enter into mating engagement upon relative movement of the plates into coupled relation. Relative movement of the plates from coupled relation disengages the service couplings. Such automatic engagement and disengagement of the service couplings requires alignment of the table plate in a predetermined angular position on its rotation axis relative to the wheel plate during coupling and uncoupling of the plates. Moreover, retention of the service couplings in their engaged relation during travel of the tractor-trailer vehicle requires interlocking of the wheel and table plate against relative rotation when in coupled relation. According to a second important feature of the invention, the wheel and table plates are equipped with coacting alignment means for thus aligning and interlocking the plates.

BRIEF DESCRIPTION OF THE DRAWINGS

FIG. 1 is a side elevation of a tractor-trailer vehicle embodying the fifth wheel coupling of the invention;
FIG. 2 is an enlarged section taken on line 2—2 in FIG. 1;
FIG. 3 is a section view taken at line 3—3 in FIG. 2;
FIG. 4 is a section view taken at line 3—in FIG. 3; and
FIG. 5 is a section view taken at line 5—5 in FIG. 4.

DESCRIPTION OF THE PREFERRED EMBODIMENT

The drawings illustrate a tractor-trailer vehicle 10 including a fifth wheel coupling 12 according to the invention for coupling the vehicle tractor 14 to the vehicle trailer 16. Coupling 12 includes a so-called fifth wheel in the form of a wheel plate 18 having a central coupling socket 20 and a tapered slot 22 extending from the socket through the normally rear edge of the plate. Mounted on the under side of the wheel plate is a retractable lock bolt 24. Lock bolt 24 is supported on bearing 26 for longitudinal movement, transverse to the slot 22, between an extended locking position and a retracted position. In its locking position, the bolt extends across the forward end of the slot 22, that is, the end adjacent the coupling socket 20, and through openings on boundary flanges 32 along the edges of the slot. In its retracted position, the bolt is withdrawn clear of the slot.

Below the wheel plate 18 is a mounting bracket 30 to which the plate is pivotally attached by a hinge pin in 33, for rocking of the plate relative to the bracket on a pivot axis intersecting at right angles the axes of the coupling socket 20 and the slot 22. The wheel plate 18 is installed in the tractor 14 by rigidly attaching the plate mounting bracket 30 to the rear of the vehicle frame. When thus installed, the pivot axis of the plate extends laterally of the tractor and the plate slot 22 extends rearwardly from the plate coupling socket 20.

In addition to the wheel plate 18, the fifth wheel coupling 12 includes a turntable in the form of a rotary plate 34, herein referred to as a table plate, on the trailer 16. Wheel plate 34 is circular in shape and is rotatably attached to the normally underside of a mounting plate 36 by means of a bearing ring 38. This bearing ring is rigidly fixed to the mounting plate 36 and has a flange 40 overlapping the edge of the table plate. The bearing ring and mounting plate support the table plate for turning on its central axis. Rigidly joined to and depending from the underside of the table plate on its central rotation axis is a king-pin 42 having a circumferential locking flange 44. The table plate 34 is mounted on the trailer 16 by rigidly securing the mounting plate 36 to the trailer.

The drawings illustrate the fifth wheel plate 18 and table plate 34 assembled in coupled relation to connect the tractor 14 to the trailer 16. In this coupled relation, the table plate king-pin 42 is contained within the wheel plate socket 20 and the lock bolt 24 is extended across the wheel plate slot 22 to lock the stud in the socket. The table plate 34 rests on the wheel plate 18 to vertically support the front end of the trailer 16 on the tractor 14. Uncoupling of the tractor from the trailer is accomplished by retracting the lock bolt 24 and driving the tractor from under the trailer while the front end of the trailer is supported on its supporting struts 46. During this uncoupling motion of the tractor, the table plate king-pin 42 emerges from the wheel plate socket 20 through the wheel plate slot 22. Recoupling of the tractor and trailer is accomplished by reversing this procedure.

Extending between the tractor 14 and trailer 16 are electrical conduits 48 for transmitting electrical current and air conduits 50 for conducting brake operating air between the tractor and trailer. These conduits include couplings 52 and 54, respectively, which must be disengaged when the tractor and trailer are uncoupled and engaged when the tractor and trailer are coupled.

According to one important feature of the invention, the conduit couplings 52, 54 are engaged and disengaged automatically upon relative movement of the tractor 14 and trailer 16 into and from coupled relation. To this end, each electrical conduit coupling 52 has a first coupling part 52a mounted on the wheel plate 18 and a second coupling part 52b mounted on the table plate 34. Similarly, each air conduit coupling 54 has a first coupling part 54a mounted on the wheel plate and a second coupling part 54b mounted on the table plate. Air couplings 54 are located in the plane of the wheel plate 18. The electrical couplings are located directly below the air couplings. The two parts of each coupling are so located on their respective plates that the parts are coaxially aligned when the table plate 34 occupies its angular position of FIG. 2 relative to the wheel plate 18. It will now be understood, therefore, that the corresponding coupling parts are arranged for relative movement into and from mating engagement during relative coupling and uncoupling movement of the tractor 14 and trailer 16 with the table plate 18 oriented in its angular position of FIG. 2.

One air conduit coupling 54 is illustrated in enlarged detail in FIG. 5. The wheel plate part 54a of this coupling is a male part having a tubular stem 56 terminating in a rear conical tip 58 surrounded by an O-ring 60. Stem 56 is slidably supported in a flange 62 rigid on the wheel plate 18. A spring 64 urges the coupling part 54a rearwardly. Threaded on the front end of the stem 56 is an adjustable stop nut to limit rearward extension of the part 54a when the coupling 54 is disengaged. The table plate coupling part 54b is a female part having a stem 66 terminating in a forwardly opening conical socket 68 for receiving, in mating engagement, the conical tip 58 on the male coupling part 54a. Stem 66 is firmly attached to a flange 70 rigid on the table plate 34.

From the above description of the air coupling 54, it is evident that its coupling parts 54a, 54b are adapted to undergo relative movement into and from mating engagement during coupling and uncoupling of the tractor 14 and trailer 16. During engagement of the coupling, the male coupling part 54a yields rearwardly against the action of spring 64 following engagement of its tip 58 in the socket 68 of the female part 54b, such that the spring retains the parts in finally coupled relation. In this regard, it will be understood that the coupling spring is sufficiently strong to prevent separation of the coupling parts under the action of the maximum braking air pressure in the coupling.

One electrical coupling 52 is also detailed in FIG. 5. The coupling parts 52a, 54a are mounted on flanges 62 and 72 rigid on the wheel plate 18 and table plate 34, respectively, as shown in FIG. 5.

According to a further feature of the invention, the fifth wheel coupling 12 is equipped with alignment means 74 for automatically orienting or aligning the rotary table plate 34 in its angular position of FIG. 2, wherein the conduit couplings 52, 54 are conditioned for automatic engagement, upon relative movement of the table plate and wheel plate 18 into coupled relation and for interlocking the plates against relative rotation when assembled in coupled relation to prevent disengagement of the conduit couplings during travel. Alignment means 74 comprise a pair of guide bars 76 rigidly mounted on the wheel plate in parallel relation to the centerline of the wheel plate slot 22 and the axes of the wheel plate coupling parts 52a, 54a. These bars straddle the latter coupling parts and are rigidly joined to their mounting flanges 62 and additional flanges 78 on the wheel plate. The alignment means comprise a second pair of guide bars 80 rigid on the rotary table plate 34. These latter bars straddle and parallel the axes of the table plate coupling parts 52a, 54b and are spaced to straddle, in sliding relation, the wheel plate guide bars 76. As shown in FIG. 2, the forward ends of the table plate guide bars 80 turn outwardly at slight angles to facilitate entrance therebetween of the wheel plate guide bars 76 during relative movement of the plates into coupled relation. It will now be understood that during movement of the tractor-trailer vehicle 10, rotation in the fifth wheel coupling 12 during turning involves rotation of the table plate 34 relative to the trailer 16.

One unique advantage of the present fifth wheel coupling resides in the fact that it permits either the tractor 14 or trailer 16 of a tractor-trailer vehicle equipped with the coupling to be coupled to a trailer or tractor, as the case may be, equipped with a conventional fifth wheel coupling.

What is claimed is:

1. A fifth wheel coupling for a tractor-trailer vehicle comprising:
   a fifth wheel plate having a central axis,
   means for mounting said wheel plate on said tractor,
   a table plate having a central rotation axis,
   means for rotatably mounting said table plate on said trailer for turning on said rotation axis,
   coacting releasable connecting means on said plates releasably joining said plates in coupled relation wherein said central axes coincide with said table plate rests on said wheel plate, said connecting means comprising a king-pin depending from the underside of said table plate on said rotation axes thereof, a central coupling socket in said wheel plate on said central axes thereof, receiving said king-pin, a radial slot in said wheel plate extending from said socket through the circumference of said wheel plate, and a retractable lock bolt extending laterally across the end of said slot adjacent said socket for releasably locking said king-pin in said socket,
   said plates being relatively movable along given direction lines into and from coupled relation, and the relative movement of said king-pin with respect to said wheel plate during relative movement of said plate along said direction lines into and from coupled relation occurring lengthwise through said slot,
   said lock bolt being retractable to permit relative movement of said king-pin into and from said socket through said slot,
   mating conduit coupling parts mounted on said plates, respectively, for relative movement into and from mating engagement upon relative movement of said plates along said direction lines into and from coupled relation,
   coacting alignment means on said plates, respectively, for aligning said table plate in a predetermined angular position on its rotation axis relative to said wheel plate upon relative movement of said plates along said direction lines into coupled relation and interlocking said plates against relative rotation when in coupled relation, said alignment means comprising guides on said wheel plate paralleling the longitudinal centerline of said slot and guides on said table plate engageable with said wheel plate guides during relative movement of said plates along said directions into and from coupled relation, and
   said coupling parts being disposed to mate upon relative movement of said plates along said direction lines into coupled relation with said table plate aligned in said predetermined angular position.

2. A fifth wheel coupling according to claim 1 wherein: said conduit coupling parts comprise an electrical coupling.

3. A fifth wheel coupling according to claim 1 wherein:

said conduit coupling parts comprise a hose coupling.

4. A fifth wheel coupling according to claim 1 including:

coacting alignment means on said plates, respectively, for aligning said table plate in a predetermined angular position on its rotation axis relative to said wheel plate upon relative movement of said plates along said direction lines into coupled relation and interlocking said plates against relative rotation when in coupled relation, and said coupling parts being disposed to mate upon relative movement of said plates along said direction lines into coupled relation with said table plate aligned in said predetermined angular position.

5. A fifth wheel coupling according to claim 1 wherein:

said guides comprise guide bars.

6. A fifth wheel coupling according to claim 5 wherein:

the axis of said wheel plate coupling part parallels said wheel plate guide bars and the axis of said table plate coupling part parallels said table guide bars.

7. A fifth wheel coupling according to claim 6 wherein:

one coupling part has a tapered coupling socket and the other coupling part has a tapered end engageable in said tapered coupling socket.

8. A fifth wheel coupling for a tractor-trailer vehicle comprising:

a fifth wheel plate having a central axis, means for mounting said wheel plate on said tractor, a table plate having a central rotation axis, means for rotatably mounting said table plate on said trailer for turning on said rotation axis, coacting releasable connecting means on said plates releasably joining said plates in coupled relation wherein said central axes coincide with said table plate rests on said wheel plate, said connecting means comprising a king-pin depending from the underside of said table plate on said rotation axes thereof, a central coupling socket in said wheel plate on said central axes thereof, receiving said king-pin, a radial slot in said wheel plate extending from said socket through the circumference of said wheel plate, and means for releaseably locking said king-pin in said socket, said plates being relatively movable along given direction lines into and from coupled relation, and the relative movement of said king-pin with respect to said wheel plate during relative movement of said plate along said direction lines into and from coupled relation occurring lengthwise through said slot, mating conduit coupling parts mounted on said plates, respectively, for relative movement into and from mating engagement upon relative movement of said plates along said direction lines into and from coupled relation, coacting alignment means on said plates, respectively, for aligning said table plate in a predetermined angular position on its rotation axis relative to said wheel plate upon relative movement of said plates along said direction lines into coupled relation and interlocking said plates against relative rotation when in coupled relation, said alignment means comprising guides on said wheel plate paralleling the longitudinal centerline of said slot and guides on said table plate engageable with said wheel plate guides during relative movement of said plates along said directions into and from coupled relation, and said coupling parts being disposed to mate upon relative movement of said plates along said direction lines into coupled relation with said table plate aligned in said predetermined angular position.

* * * * *